(12) United States Patent
Guan

(10) Patent No.: US 8,014,627 B2
(45) Date of Patent: Sep. 6, 2011

(54) IMAGE PROCESSING APPARATUS, IMAGING APPARATUS, IMAGE PROCESSING METHOD, AND COMPUTER PROGRAM PRODUCT

(75) Inventor: Haike Guan, Kanagawa (JP)

(73) Assignee: Ricoh Company, Tokyo (JP)

( * ) Notice: Subject to any disclaimer, the term of this patent is extended or adjusted under 35 U.S.C. 154(b) by 967 days.

(21) Appl. No.: 11/657,196

(22) Filed: Jan. 23, 2007

(65) Prior Publication Data

US 2007/0172146 A1 Jul. 26, 2007

(30) Foreign Application Priority Data

Jan. 23, 2006 (JP) ................................. 2006-014054

(51) Int. Cl.
*G06K 9/40* (2006.01)
(52) U.S. Cl. ........... 382/275; 382/167; 386/25; 348/664
(58) Field of Classification Search ........................ None
See application file for complete search history.

(56) References Cited

U.S. PATENT DOCUMENTS

| | | | | |
|---|---|---|---|---|
| 5,047,840 A * | 9/1991 | Miki | ............................. | 348/664 |
| 5,047,866 A * | 9/1991 | Watanabe et al. | ............. | 386/269 |
| 6,807,300 B1 * | 10/2004 | Gindele et al. | ................ | 382/167 |
| 7,016,081 B2 | 3/2006 | Araki | | |
| 2002/0051569 A1 | 5/2002 | Kita | | |
| 2004/0027469 A1 | 2/2004 | Tsuruoka | | |

FOREIGN PATENT DOCUMENTS

| | | |
|---|---|---|
| EP | 1 176 801 | 1/2002 |
| EP | 1 361 747 | 11/2003 |
| EP | 1450551 A1 | 8/2004 |
| EP | 1 694 077 | 8/2006 |
| JP | 2002-44473 | 8/2002 |
| JP | 2003-234950 | 8/2003 |
| JP | 2003-242501 | 8/2003 |
| JP | 2004-297731 | 10/2004 |
| JP | 2005-44915 | 2/2005 |
| JP | 2005-175718 | 6/2005 |
| JP | 2005-184786 | 7/2005 |
| WO | WO 2005/057938 A | 6/2005 |

OTHER PUBLICATIONS

European Office Action for corresponding European Patent Application No. 07250085.3, Jan. 28, 2010, 6 pgs.
European Search Report for EP Appln No. 07250085.3, mailed May 14, 2007 (6 pages).
Chinese Office Action for CN Appln No. 2007100042911 Issue Date May 16, 2008 (20 pages).
Japanese Office Action for JP Application No. 2006-014054, mailing date Feb. 1, 2011 (2 pgs).

* cited by examiner

*Primary Examiner* — Anand Bhatnagar
*Assistant Examiner* — Tsung-Yin Tsai
(74) *Attorney, Agent, or Firm* — Blakely, Sokoloff, Taylor & Zafman LLP

(57) ABSTRACT

An image-information acquiring unit acquires image information. A component separating unit separates the image information acquired into luminance information and color information. A luminance-component-noise removing unit removes noise from the luminance information using a first noise removing method. A color-component-noise removing unit removes noise from the color information using a second noise removing method different from the first noise removing method used in the luminance-component-noise removing unit.

13 Claims, 10 Drawing Sheets

| IMAGING CONDITIONS | | | SELECTED FILTER | |
|---|---|---|---|---|
| SENSITIVITY OF CAMERA | EXPOSURE TIME | TEMPERATURE AT THE TIME OF IMAGING | LUMINANCE FILTER | COLOR FILTER |
| × × × | × × × | × × × | SIZE INFORMATION 1 | SIZE INFORMATION 2 |
| : | : | : | : | : |

FIG. 2

| IMAGING CONDITIONS | | | SELECTED FILTER | |
|---|---|---|---|---|
| SENSITIVITY OF CAMERA | EXPOSURE TIME | TEMPERATURE AT THE TIME OF IMAGING | LUMINANCE FILTER | COLOR FILTER |
| × × × | × × × | × × × | SIZE INFORMATION 1 | SIZE INFORMATION 2 |
| ⋮ | ⋮ | ⋮ | ⋮ | ⋮ |

FIG. 3

| IMAGING CONDITIONS | | | σ VALUE |
|---|---|---|---|
| SENSITIVITY OF CAMERA | EXPOSURE TIME | TEMPERATURE AT THE TIME OF IMAGING | |
| × × × | × × × | × × × | × × |
| ⋮ | ⋮ | ⋮ | ⋮ |

FIG. 5

$\dfrac{1}{273}$

| 1 | 4 | 7 | 4 | 1 |
|---|---|---|---|---|
| 4 | 16 | 26 | 16 | 4 |
| 7 | 26 | 41 | 25 | 7 |
| 4 | 16 | 26 | 16 | 4 |
| 1 | 4 | 7 | 4 | 1 |

FIG. 6

$\dfrac{1}{9}$

| 1 | 1 | 1 |
|---|---|---|
| 1 | 1 | 1 |
| 1 | 1 | 1 |

IMAGE PROCESSING APPARATUS, IMAGING APPARATUS, IMAGE PROCESSING METHOD, AND COMPUTER PROGRAM PRODUCT

PRIORITY

The present application claims priority to and incorporates by reference the entire contents of Japanese priority document, 2006-014054, filed in Japan on Jan. 23, 2006.

BACKGROUND OF THE INVENTION

1. Field of the Invention

The present invention relates to an image processing apparatus, an imaging apparatus, an image processing method, and a computer program product, and, more particularly to removal of noise.

2. Description of the Related Art

In recent years, in a digital still camera (hereinafter, "digital camera"), an increase in the number of pixels of a charge coupled device (CCD) has occurred. On the other hand, according to the increase in the number of pixels of the CCD, sensitivity of the CCD has deteriorated.

As a solution for such a problem, an imaging apparatus that adds up pixels of a plurality of images is disclosed in Japanese Patent Application Laid-Open No. 2005-44915. In such an imaging apparatus, it is possible to improve sensitivity by adding up the pixels of the images.

When images are picked up with improved sensitivity, noise is emphasized. A technique for removing noise by setting a cutoff frequency of a low-pass filter according to imaging sensitivity is disclosed in Japanese Patent Application Laid-Open No. 2004-297731.

However, as disclosed in Japanese Patent Application Laid-Open No. 2005-44915, exposure time is long because the pixels of the images are added up. Although the long exposure time causes no problem when a camera is fixed and a subject does not move, positional deviation occurs when the camera or the subject moves.

In the technology described in Japanese Patent Application Laid-Open No. 2004-297731, although it is possible to remove noise according to the imaging sensitivity, edges of the image blur. For example, if sensitivity is set high when an image is taken in a bright place, strong blur processing is applied to the image with less noise to blur in the image more than necessary.

SUMMARY OF THE INVENTION

An image processing apparatus, imaging apparatus, image processing method, and computer program product are described. In one embodiment, an image processing apparatus comprises an image-information acquiring unit that acquires image information; an image-component separating unit that separates the image information acquired by the image-information acquiring unit into luminance information and color information; a luminance-noise removing unit that removes noise from the luminance information by using a first noise removing method; and a color-noise removing unit that removes noise from the color information by using a second noise removing method different from the first noise removing method.

DESCRIPTION OF THE DRAWINGS

FIG. 2 is a table illustrating an example of a data structure of a filter size database;

FIG. 3 is a table illustrating an example of a data structure of a Gaussian σ value database;

FIG. 5 is a diagram of a Gaussian smoothing filter having a σ value of 1 and a filter size of 5×5;

FIG. 6 is a diagram of an example of a smoothing filter having a filter size of 3×3;

DETAILED DESCRIPTION OF THE PREFERRED EMBODIMENTS

According to an embodiment of the present invention, an image processing apparatus includes an image-information acquiring unit that acquires image information; an image-component separating unit that separates the image information acquired by the image-information acquiring unit into luminance information and color information; a luminance-noise removing unit that removes noise from the luminance information by using a first noise removing method; and a color-noise removing unit that removes noise from the color information by using a second noise removing method different from the first noise removing method.

According to another embodiment of the present invention, an image processing method includes acquiring image information; separating the image information acquired by the image-information acquiring unit into luminance information and color information; removing noise from the luminance information by using a first noise removing method; removing noise from the color information by using a second noise removing method different from the first noise removing method.

According to still another embodiment of the present invention, a computer program product comprising a computer usable medium having computer readable program codes embodied in the medium that when executed causes a computer to execute acquiring image information; separating the image information acquired by the image-information acquiring unit into luminance information and color information; removing noise from the luminance information by using a first noise removing method; and removing noise from the color information by using a second noise removing method different from the first noise removing method.

The above and other embodiments, features, advantages and technical and industrial significance of this invention will be better understood by reading the following detailed description of presently preferred embodiments of the invention, when considered in connection with the accompanying drawings.

Exemplary embodiments of the present invention are explained in detail below with reference to the accompanying drawings.

Figure 1:
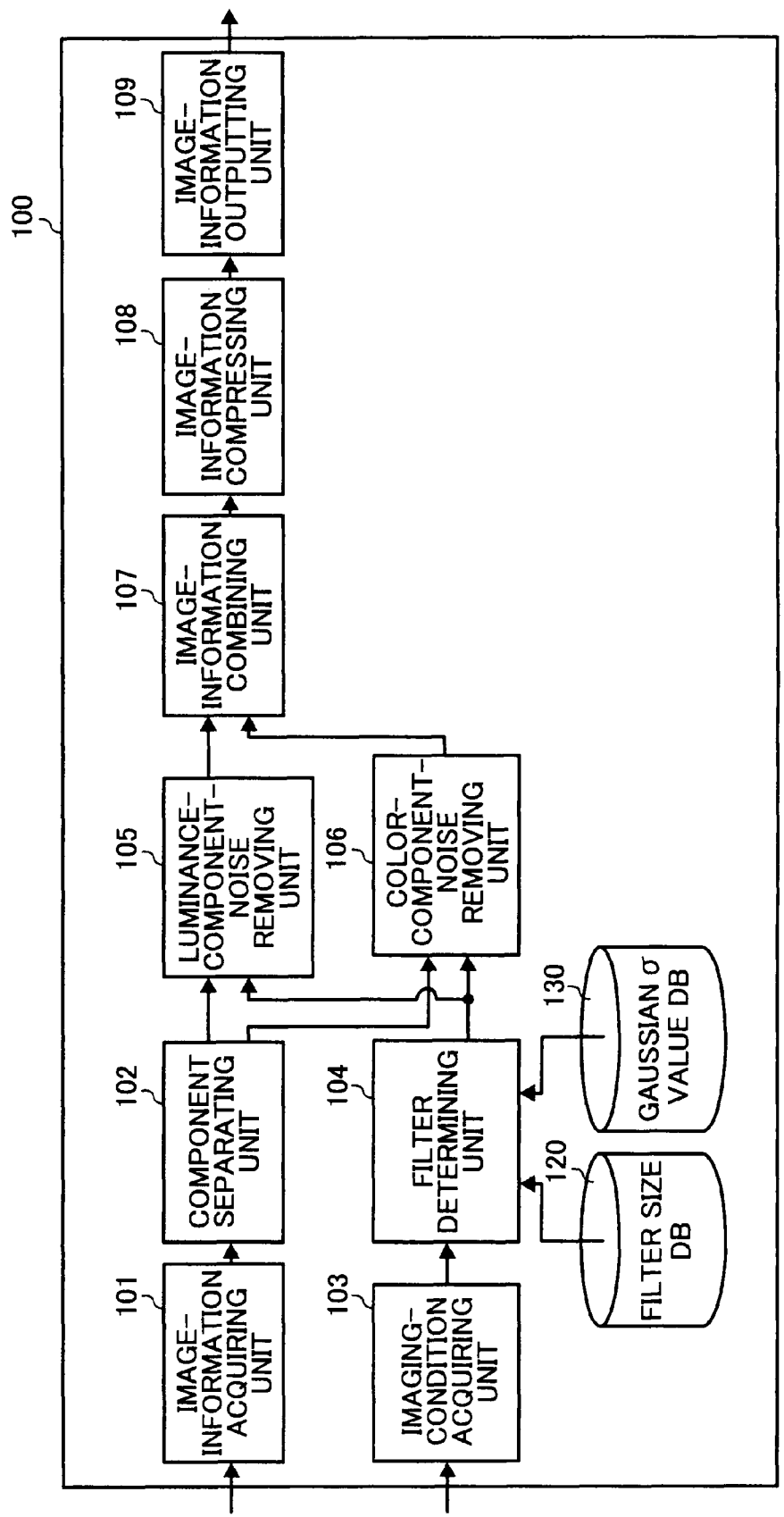
FIG. 1 is a block diagram of an image processing unit according to a first embodiment of the present invention.

A first embodiment of the present invention is explained with reference to the accompanying drawings. First, an example of a structure of an image processing unit included in a digital camera, to which the present invention is applied, is explained. FIG. 1 is a block diagram of a structure of an image processing unit 100 according to the first embodiment.

The image processing unit 100 according to the first embodiment includes an image-information acquiring unit 101, a component separating unit 102, an imaging-condition acquiring unit 103, a filter determining unit 104, a luminance-component-noise removing unit 105, a color-component-noise removing unit 106, an image-information combining unit 107, an image-information compressing unit 108, an image-information outputting unit 109, a filter size database 120, and a Gaussian σ value database 130.

The filter size database 120 defines a filter size, i.e., coarseness of filters, for noise removal corresponding to imaging conditions. FIG. 2 is a table illustrating an example of a data structure of the filter size database 120. The filter size database 120 stores therein imaging conditions and filter sizes, i.e., filter coarseness, in associated manner.

The imaging conditions are conditions affecting noise in an image taken by a digital camera. Specifically, sensitivity of a camera, an exposure time, and temperature at the time of imaging are defined as the imaging conditions. The sensitivity of a camera is sensitivity of a CCD or a complimentary metal oxide semiconductor (CMOS) sensor. As the sensitivity is higher, shutter speed is higher in the same situation, an image is less easily blurred, and it is possible to pick up an image of a moving subject without a blur. Further, it is possible to take a bright image even in a dark place. On the other hand, when the sensitivity is increased, noise easily occurs.

The exposure time is time during which the CCD or the CMOS sensor is exposed to light. When the sensitivity is high, it is possible to take an image even if the exposure time is reduced. The temperature at the time of imaging is an outdoor air temperature at the time when an image is taken by the camera. When the temperature is lower, noise less easily occurs.

The filter size is a size of a filter specified by the imaging conditions. The size of a filter is stored for each of luminance information and color information. As the size of a filter is larger, a larger effect of noise removal is realized. On the other hand, an edge blur of an image increases. In other words, the noise removal effect and the edge blur are in a tradeoff relation. A level of noise of a picked-up image changes according to a difference of imaging conditions. Thus, it is possible to perform optimum noise removal by selecting a size of a filter according to imaging conditions at the time of imaging.

Human eyes have a characteristic that the human eyes are sensitive to a change in brightness but are insensitive to a change in a color. Thus, it is possible to perform effective noise removal taking into account the characteristic of the human eyes by setting a filter size for the luminance information smaller than a filter size for the color information. Image information of a YUV format includes luminance information (Y) and color information (U, V). The luminance information (Y) takes a numerical value substantially proportional to intensity that the human eyes feel as "brightness". In the color information (U, V), U represents a hue and a chroma of a shade of blue and V represents a hue and a chroma of a shade of red. It is possible to optimally remove noise by applying noise removal processing, which corresponds to each of the luminance information and the color information, to the information. In this embodiment, a size stored in size information 1, which is a size of a luminance filter, is smaller than a size stored in size information 2, which is a size of a color filter, in the filter size database 120.

In this embodiment, the sensitivity of a camera, the exposure time, and the imaging temperature are the imaging conditions. However, if there is another condition that changes a level of noise, a size of a filter may be selected according to the condition. A size of a filter may be selected according to the condition in addition to the sensitivity of a camera, the exposure time, and the imaging temperature.

The Gaussian σ value database 130 defines a σ value for calculating a value of a Gaussian smoothing filter for noise removal corresponding to the imaging conditions. FIG. 3 is a table illustrating an example of a data structure of the Gaussian σ value database 130. The Gaussian σ value database 130 stores therein the imaging conditions and σ values for calculating values of the Gaussian smoothing filter in association with each other.

A magnitude of σ represents the strength of noise removal. When σ is large, the noise removal effect is large. A filter is not calculated only by the Gaussian function. The noise removal processing may be performed using filters calculated by other functions.

The image-information acquiring unit 101 acquires image information from a temporary saving memory. The image information acquired is image information converted into the YUV format. The component separating unit 102 separates the image information of the YUV format acquired by the image-information acquiring unit 101 into the luminance information (Y) and the color information (U, V).

The imaging-condition acquiring unit 103 acquires imaging conditions corresponding to the image information acquired from the temporary saving memory by the image-information acquiring unit 101. The imaging conditions are the imaging conditions at the time of imaging, that is, the sensitivity of a camera, the exposure time, and the temperature at the time of imaging. The imaging conditions are saved in association with the image information. The imaging conditions at the time of imaging may be saved as a part of the image information.

The filter determining unit 104 specifies a size of a filter associated with the imaging conditions, which are acquired by the imaging-condition acquiring unit 103, in the file size database 120. A size of a luminance filter for removing noise of the luminance information and a size of a color filter for removing noise of the color information are specified, respectively. The size of a filter represents strength of noise removal. When the size of a filter is large, an effect of noise removal is large.

The filter determining unit 104 specifies a σ value of a Gaussian function associated with the imaging conditions, which are acquired by the imaging-condition acquiring unit 103, in the Gaussian σ value database 130.

The luminance-component-noise removing unit 105 calculates a luminance filter (a Gaussian smoothing filter) according to Equation 1 using the size of the luminance filter specified in the filter size database 120 and the σ value of the Gaussian function specified by the filter determining unit 104.

$$G(x, y) = \frac{1}{2\pi\sigma^2} e^{-\frac{x^2+y^2}{2\sigma^2}} \qquad (1)$$

Further, the luminance-component-noise removing unit 105 applies noise removal processing to the luminance information separated by the component separating unit 102 using a luminance filter (a low-pass filter).

The color-component-noise removing unit 106 calculates a color filter (a Gaussian smoothing filter) using the size of the color filter specified in the file size database 120 and the σ value of the Gaussian function specified by the filter determining unit 104. An equation for the calculation is Equation 1 described above. The color-component-noise removing unit 106 applies noise removal processing to the color information separated by the component separating unit 102 using a color filter (a low-pass filter).

The image-information combining unit 107 combines the luminance information, from which noise is removed by the luminance-component-noise removing unit 105, and the luminance information, from which noise is removed by the color-component-noise removing unit 106, to generate image information of the YUV format. The image information of the YUV format may be further converted into image information of another format such as an RGB format.

The information-compressing unit 108 compresses the image information of the YUV format generated by the image-information combining unit 107 into image information of, for example, a Joint Photographic Experts group (JPEG) format. The image-information outputting unit 109 outputs the image information compressed by the image-information compressing unit 108 to a memory card or the like.

Figure 4A:
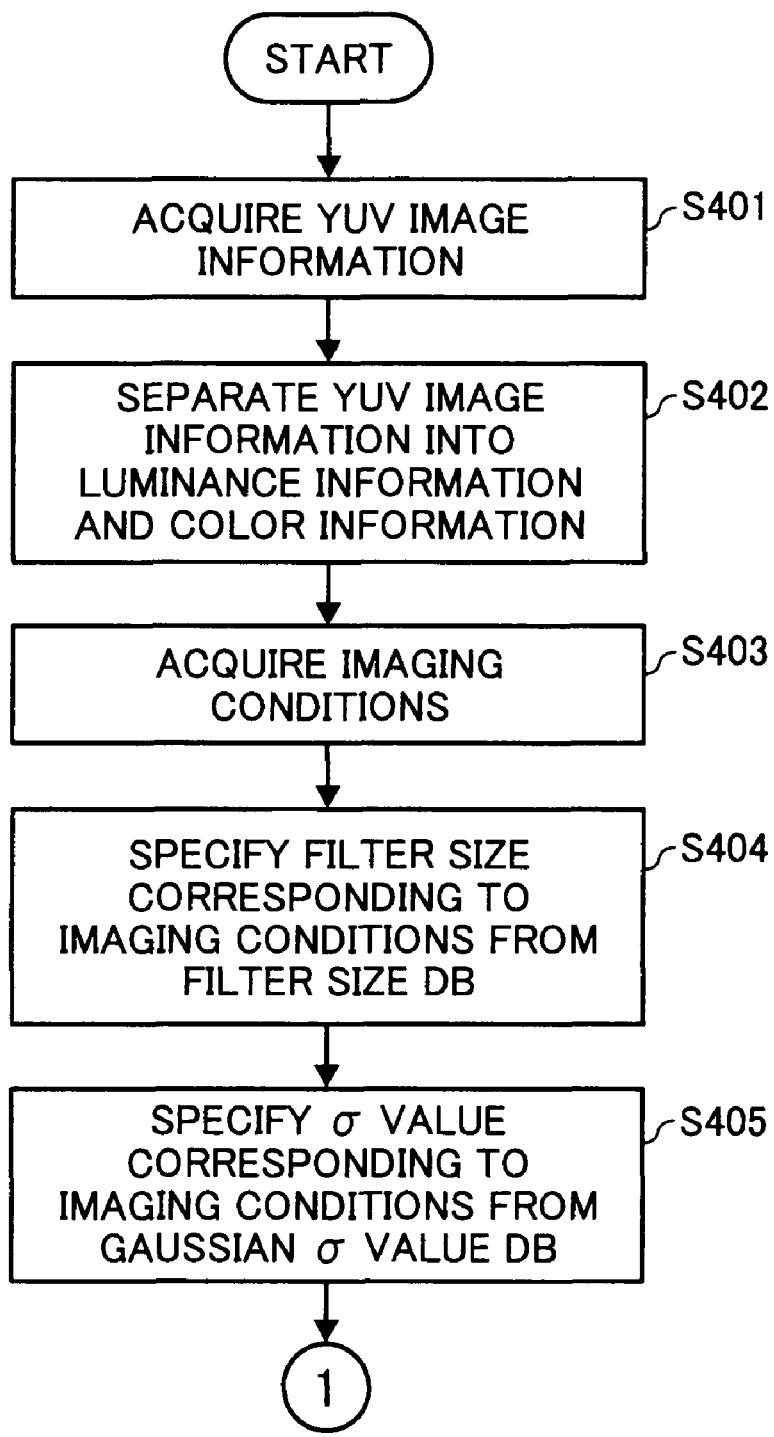
FIG. 4A and FIG. 4B are flowcharts of the operation performed by the image processing unit shown in FIG. 1.
Figure 4B:
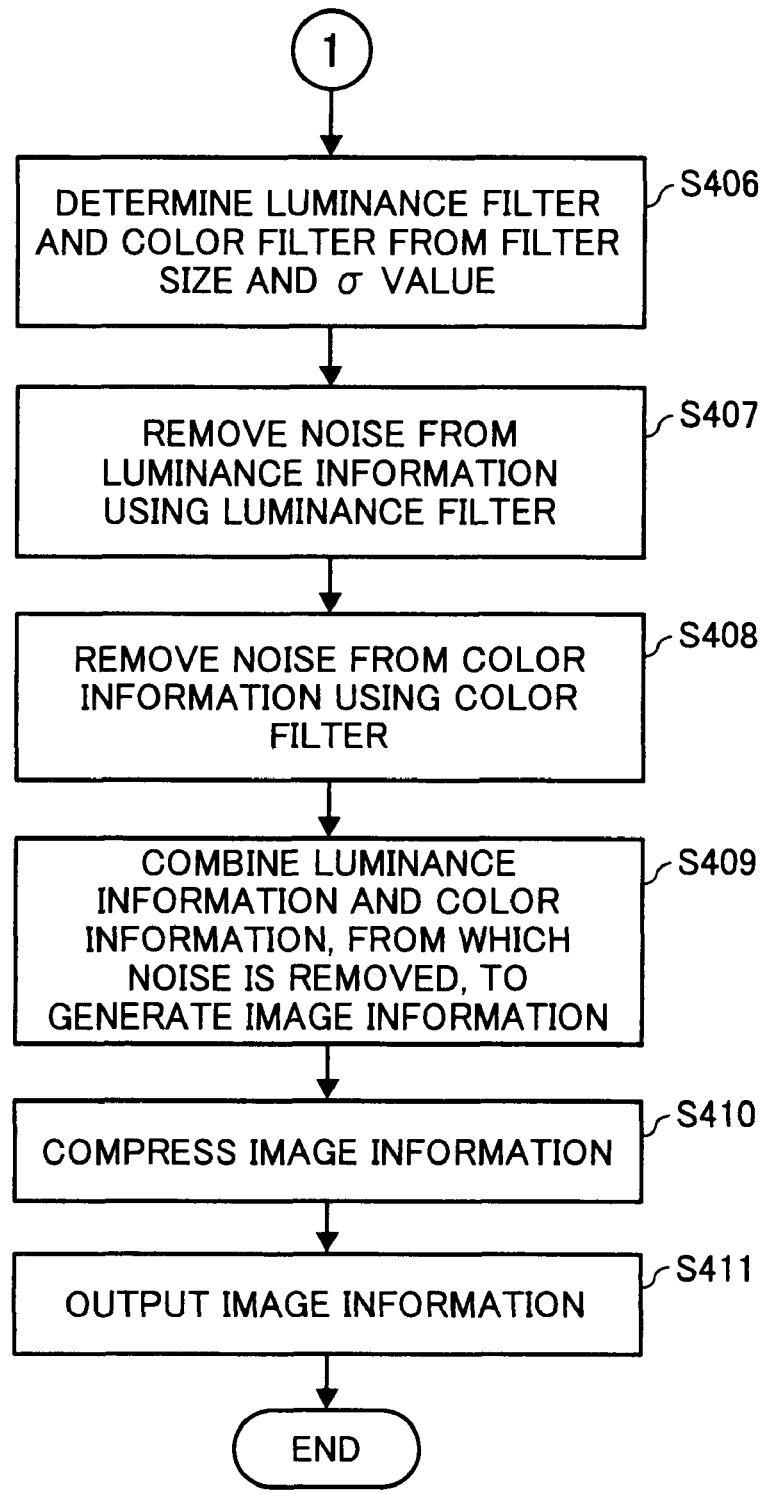

Image processing by the image processing unit described above is explained. FIGS. 4A and 4B are a flowchart of an image processing procedure performed by the image-information acquiring unit, the component separating unit, the imaging-condition acquiring unit, the filter determining unit, the luminance-component-noise removing unit, the color-component-noise removing unit, the image-information combining unit, the image-information compressing unit, and the image-information outputting unit.

The image-information acquiring unit 101 acquires image information of the YUV format from the temporary saving memory (step S401). The component separating unit 102 separates the image information of the YUV format acquired by the image-information acquiring unit 101 into luminance information and color information (step S402). The imaging-condition acquiring unit 103 acquires imaging conditions associated with the image information (step S403).

The filter determining unit 104 specifies a size of a filter corresponding to the imaging conditions, which are acquired by the imaging-condition acquiring unit 103, from the file size database 120 (step S404). Specifically, the filter determining unit 104 specifies a size of a luminance filter and a size of a color filter corresponding to sensitivity of a camera, an exposure time, and temperature at the time of imaging, which are the imaging conditions. For example, the filter determining unit 104 specifies 3×3 as a size of a luminance filter and specifies 13×13 as a size of a color filter.

The filter determining unit 104 specifies a σ value of a Gaussian function corresponding to the imaging conditions, which are acquired by the imaging-condition acquiring unit 103, from the Gaussian σ value database 130 (step S405).

The filter determining unit 104 determines a luminance filter and a color filter from the filter sizes of a luminance filter and a color filter and the σ value of the Gaussian function specified (step S406). For example, a Gaussian smoothing filter having a σ value of 1 and a filter size of 5×5 is shown in FIG. 5.

The luminance-component-noise removing unit 105 removes noise from the luminance information using the luminance filter determined by the filter determining unit 104 (step S407). The color-component-noise removing unit 106 removes noise from the color information using the color filter determined by the filter determining unit 104 (step S408).

The image-information combining unit 107 combines the luminance information and the color information, from which noise is removed, to generate image information of the YUV format (step S409). The image-information compressing unit 108 compresses the image information of the YUV format generated by the image-information combining unit 107 into image information of the JPEG format or the like (step S410). The image-information outputting unit 109 outputs the image information compressed by the image-information compressing unit 108 to a memory card or the like (step S411).

In this way, the image information is separated into the luminance information and the color information and different noise removal processing is applied to each of the luminance information and the color information. This makes it possible to effectively remove noise while holding down an edge blur and keeping a high image quality.

In the embodiment described above, to determine a luminance filter and a color filter, filter sizes and σ values of the respective filters are specified based on imaging conditions, values of the filers are calculated, and a luminance filter and a color filer are determined. As another example, a luminance filter and a color filter may be directly determined from the imaging conditions. In this case, a database that stores therein imaging conditions, luminance filters, and color filters in association with one another is provided, a luminance filter and a color filter corresponding to imaging conditions are specified, and noise is removed from luminance information and color information using the luminance filter and the color filter specified. An example of a smoothing filter having a filter size of 3×3 is shown in FIG. 6. For example, such a filter is stored as a color filter of the database.

Figure 7:
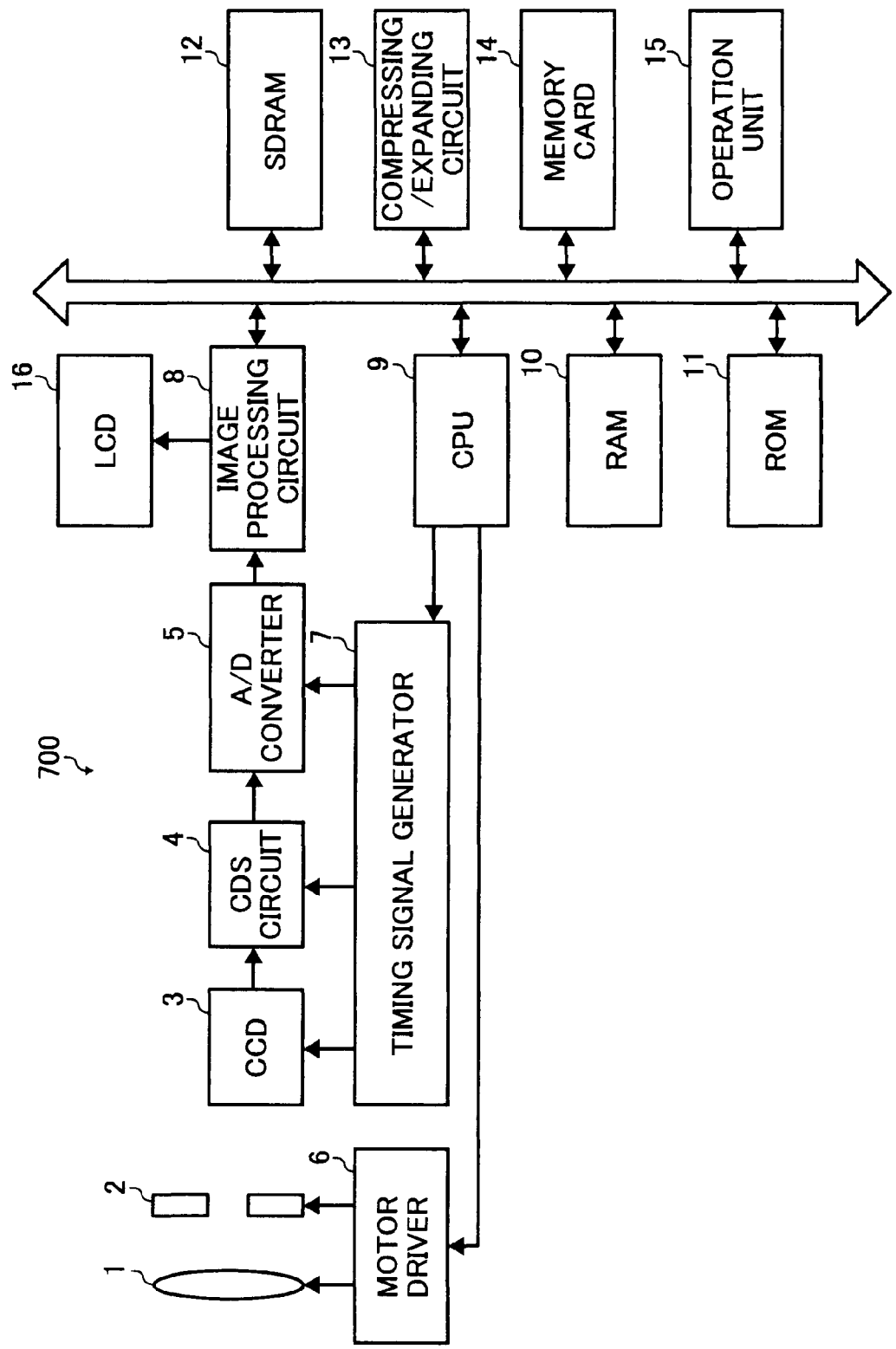
FIG. 7 is a block diagram of a hardware configuration of a digital camera according to the first embodiment.

A hardware configuration of a digital camera, which is an example of an imaging apparatus that performs the image processing described above, is explained. FIG. 7 is a block diagram showing a hardware configuration of a digital camera according to this embodiment. As shown in FIG. 7, first, subject light is made incident on a charge coupled device (CCD) 3 through a photographing optical system 1. A mechanical shutter 2 is arranged between the photographing optical system 1 and the CCD 3. It is possible to cut off the incident light on the CCD 3 using the mechanical shutter 2. The photographing optical system 1 and the mechanical shutter 2 are driven by a motor driver 6.

The CCD 3 converts an optical image focused on an imaging surface into an electric signal and outputs the optical image as analog image data. A noise component of image information outputted from the CCD 3 is removed by a correlated double sampling (CDS) circuit 4. The image information is converted into a digital value by an analog/digital (A/D) converter 5 and, then, output to an image processing circuit 8.

The image processing circuit 8 performs various kinds of image processing such as YUV conversion processing, white-balance control processing, contrast correction processing, edge emphasis processing, and color conversion processing using a synchronous dynamic random access memory (SDRAM) 12 that temporarily stores therein image data. The white-balance control processing is image processing for adjusting color density of the image information. The contrast correction processing is image processing for adjusting contrast of the image information. The edge emphasis processing is image processing for adjusting sharpness of the image information. The color conversion processing is image processing for adjusting a tone of the image information. The image processing circuit 8 displays the image information subjected to signal processing and image processing on a liquid crystal display 16 (hereinafter, "LCD 16").

The image information subjected to the signal processing and the image processing is recorded in a memory card 14 via a compressing/expanding circuit 13. The compressing/expanding circuit 13 is a circuit that compresses the image information output from the image processing circuit 8 according to an instruction acquired from an operation unit 15 and outputs the image information to the memory card 14 and, on the other hand, expands the image information read out from the memory card 14 and outputs the image information to the image processing circuit 8.

Timing of the CCD 3, the CDS circuit 4, and the A/D converter 5 is controlled by a central processing unit (CPU) 9 via a timing signal generator 7 that generates a timing signal. The image processing circuit 8, the compressing/expanding circuit 13, and the memory card 14 are also controlled by the CPU 9.

In an imaging apparatus 700, the CPU 9 performs various kinds of arithmetic processing according to programs. The imaging apparatus 700 includes a read only memory (ROM) 11 having stored therein programs and the like and a random access memory (RAM) 10 that has a work area, various data storing areas, and the like used at various processing steps. The CPU 9, the ROM 11, and the RAM 10 are connected to one another by a bus line.

When the imaging apparatus 700 performs noise removal processing, a system controller loads a sensitive-noise removal program from the ROM 11 to the RAM 10 and executes the sensitive-noise removal program. The noise removal program acquires parameters representing a setting of imaging sensitivity and an exposure time at the time of imaging via the system controller. The noise removal program reads optimum setting conditions for noise removal corresponding to the parameters from the ROM 11 and performs noise processing. An image to be processed is temporarily saved in the SDRAM 12. The noise removal program applies noise removal processing to the image saved.

A noise removing method at the time of imaging is explained. First, characteristics of sensitive noise are explained. The digital camera (the imaging apparatus) 700 changes the magnification of an amplifier of an electric circuit without changing sensitivity of the CCD 3 to adjust imaging sensitivity. Although exposure is insufficient when an exposure amount is small, it is possible to increase sensitivity by increasing the magnification of the amplifier. However, a signal of noise is simultaneously expanded. When an exposure amount is sufficient, a noise signal is relatively small and less visible. However, when exposure is insufficient, if sensitivity is increased according to the increase in the magnification, noise is expanded and sensitive noise becomes visible. Since this noise is random noise, even when a monochrome subject is photographed, color noise occurs. To remove noise associated with image information that occurs in this way, the noise removal processing is performed.

It is possible to constitute the filter size database 120 and the Gaussian σ value database 130 using any storage medium generally used such as the ROM 11 of the digital camera 700, a hard disk (HD), an optical disk, or a memory card.

The image processing program executed in the digital camera according to this embodiment may be stored on a computer connected to a network such as the Internet, downloaded through the network, and provided. Alternatively, the image processing program executed in the digital camera according to this embodiment may be provided or distributed through the network such as the Internet.

The image processing program according to this embodiment may be stored in a ROM or the like in advance and provided.

The image processing program executed in the digital camera according to this embodiment is recorded in a computer-readable recording medium such as a compact disc-read only memory (CD-ROM), a flexible disk (FD), a compact disc-recordable (CD-R), or a digital versatile disk (DVD) as a file of an installable format or an executable format and provided.

The image processing program executed in the digital camera according to this embodiment is formed as a module including the respective units described above (the image-information acquiring unit, the component separating unit, the imaging-condition acquiring unit, the filter determining unit, the luminance-component-noise removing unit, the color-component-noise removing unit, the image-information combining unit, the image-information compressing unit, the image-information outputting unit, etc.). A CPU (a processor) reads out the image processing program from the storage medium and executes the image processing program. Consequently, the respective units are loaded onto a main storage and an image-information acquiring unit, a component separating unit, an imaging-condition acquiring unit, a filter determining unit, a luminance-component-noise removing unit, a color-component-noise removing unit, an image-information combining unit, an image-information compressing unit, an image-information outputting unit, and the like are generated on the main storage as actual hardware.

The present invention is not limited to the embodiment described above. A second embodiment of the present invention is explained as another embodiment.

An image processing apparatus according to the second embodiment performs noise removal for image information in an image processing apparatus instead of the imaging apparatus. Differences from the first embodiment are explained below.

Figure 8:
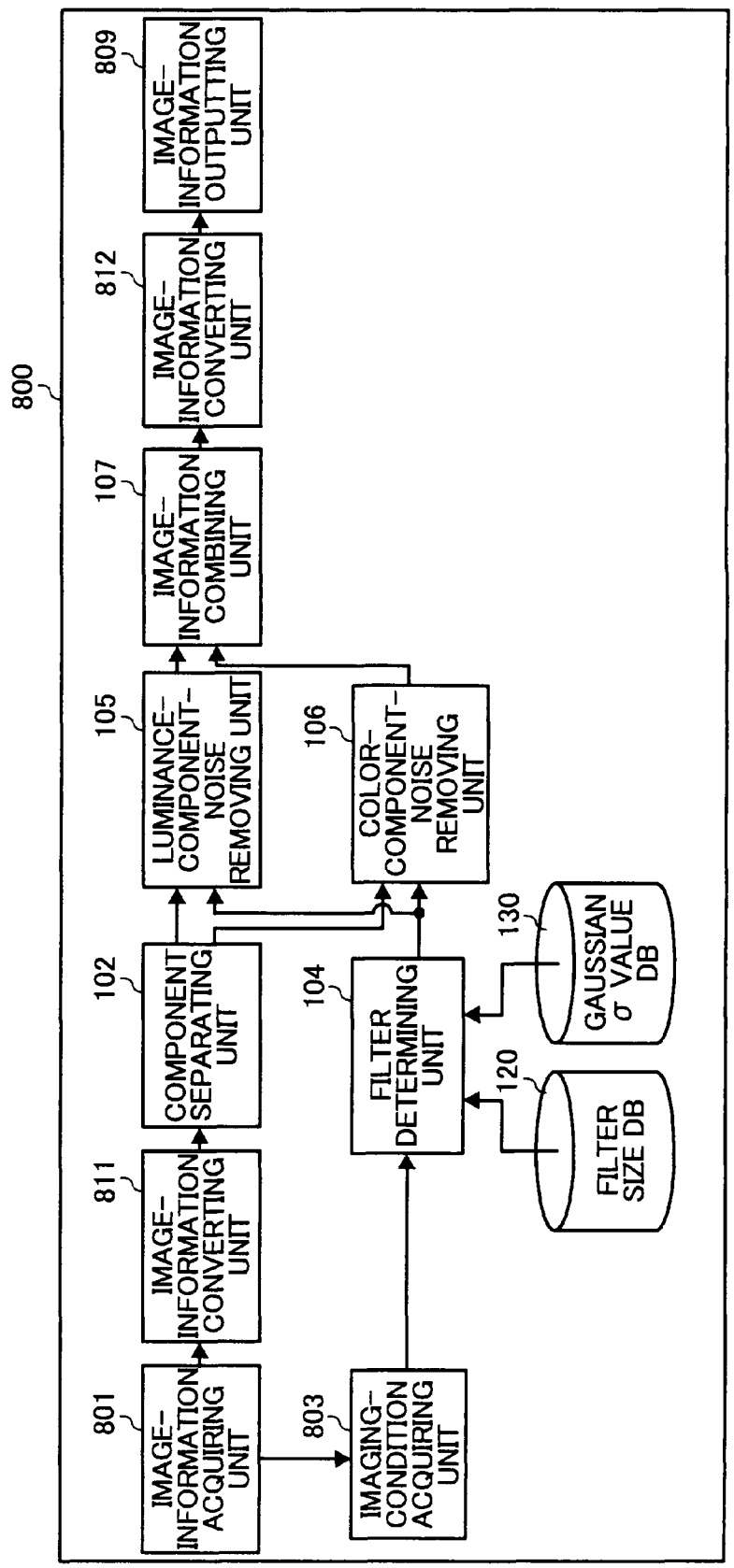
FIG. 8 is a block diagram of an image processing apparatus according to a second embodiment of the present invention.

An example of a structure of an image processing apparatus to which the present invention is applied is explained. FIG. 8 is a block diagram of the structure of the image processing apparatus according to the second embodiment. An image processing apparatus 800 according to this embodiment includes an image-information acquiring unit 801, an image-information converting unit 811, the component separating unit 102, an imaging-condition acquiring unit 803, the filter determining unit 104, the luminance-component-noise removing unit 105, the color-component-noise removing unit 106, the image-information combining unit 107, an image-information converting unit 812, an image-information output unit 809, the filter size database 120, and the Gaussian σ value database 130.

Structures and functions of the component separating unit 102, the filter determining unit 104, the luminance-component-noise removing unit 105, the color-component-noise removing unit 106, the image-information combining unit 107, the file size database 120, and the Gaussian σ value database 130 are the same as those in the first embodiment. Thus, explanations of the units are omitted.

The image-information acquiring unit 801 acquires image information stored in a storage medium or image information transmitted via a network. The image-information converting unit 811 converts the image information acquired by the image-information acquiring unit 801 into image information of the YUV format.

The imaging-condition acquiring unit 803 acquires imaging conditions from the image information acquired by the image-information acquiring unit 801. The image-information converting unit 812 converts image information of the YUV format generated by the image-information combining unit 107 into image information of another format such as the RGB format. The image-information outputting unit 809 outputs the image information converted by the image-information converting unit 812 to an HD and a printer.

Figure 9A:
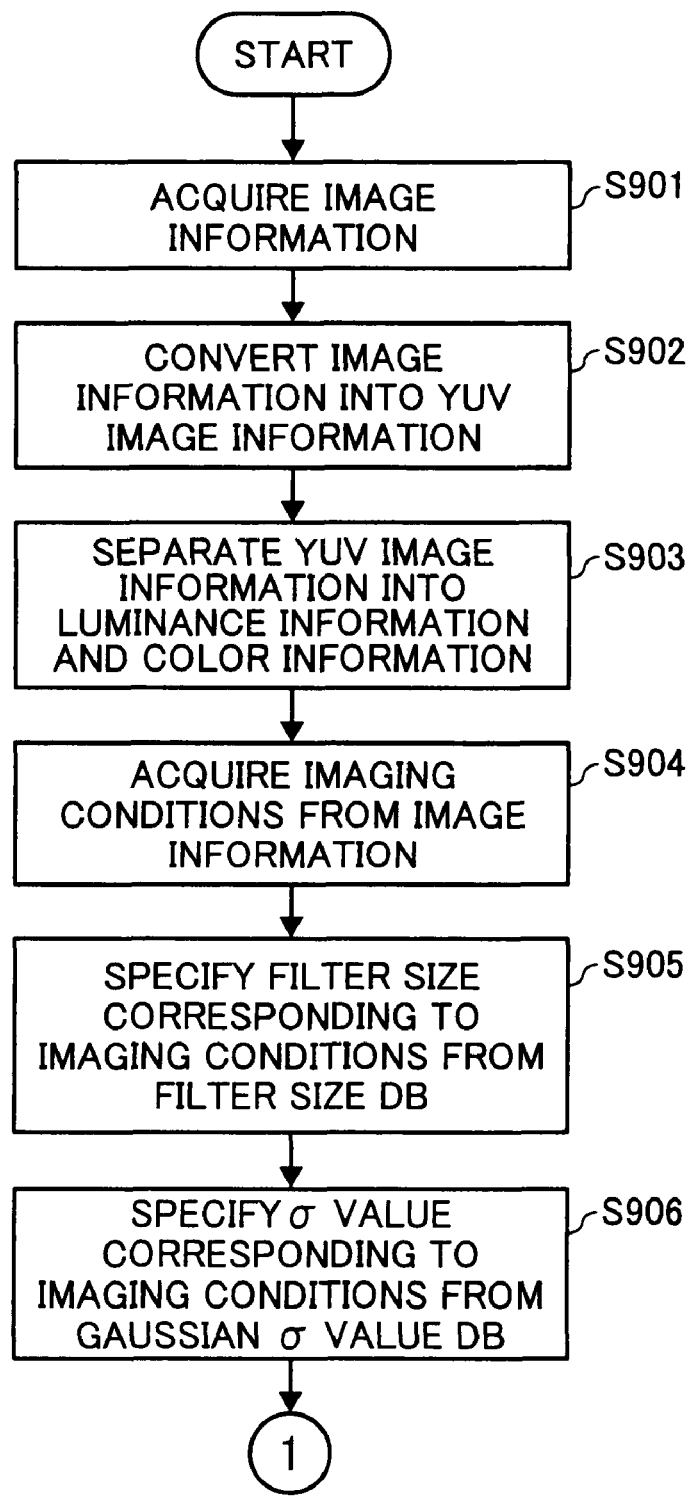
FIG. 9A and FIG. 9B are flowcharts of the operation performed by the image processing unit shown in FIG. 8.
Figure 9B:
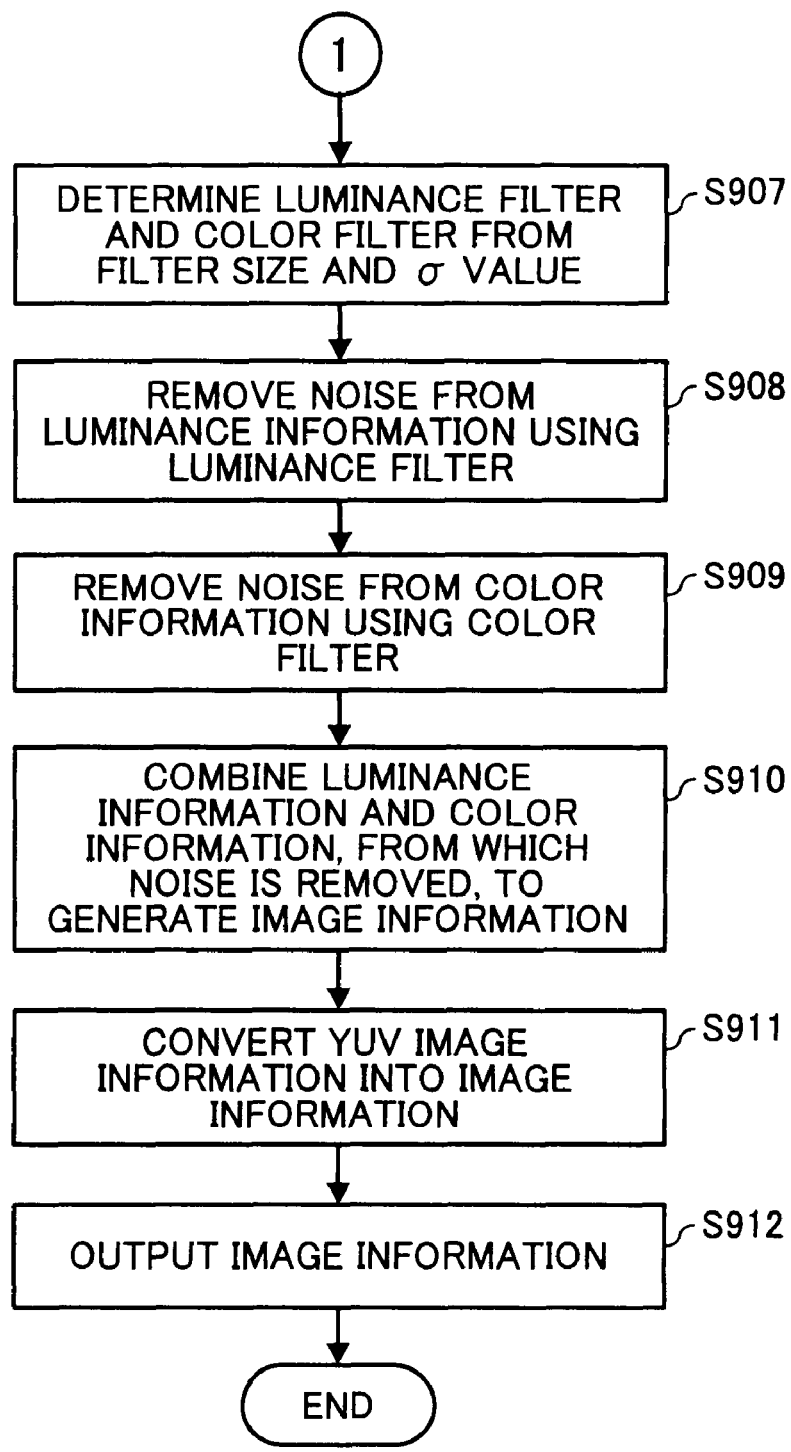

Image processing by the image processing apparatus constituted as described above is explained. FIGS. 9A and 9B are flowcharts of an image processing procedure performed by the image-information acquiring unit, the image-information converting unit, the component separating unit, the imaging-condition acquiring unit, the filter determining unit, the luminance-component-noise removing unit, the color-component-noise removing unit, the image-information combining unit, the image-information converting unit, and the image-information output unit.

The image processing procedure according to this embodiment is substantially the same as that described in the flowcharts shown in FIGS. 4A and 4B. Thus, only differences from the procedure in the flowcharts shown in FIGS. 4A and 4B are explained. Concerning steps S905 to S910, the explanations made with reference to FIGS. 4A and 4B are referred to. Explanations of steps S905 to S910 are omitted.

The image-information acquiring unit 801 acquires image information stored in a storage medium or image information transmitted via the network (step S901). The image-information converting unit 811 converts the image information acquired by the image-information acquiring unit 801 into image information of the YUV format (step S902). For example, when the image information acquired is image information of the RGB format, the image-information converting unit 811 converts the image information into image information of the YUV format according to the following conversion Equation (2).

$$\begin{bmatrix} Y \\ U \\ V \end{bmatrix} = \begin{bmatrix} 0.299 & 0.587 & 0.114 \\ 0.5 & -0.419 & -0.081 \\ -0.169 & -0.332 & 0.5 \end{bmatrix} \begin{bmatrix} R \\ G \\ B \end{bmatrix} \quad (2)$$

The component separating unit 102 separates the image information of the YUV format into luminance information and color information (step S903). The imaging-condition acquiring unit 803 acquires imaging conditions from the image information acquired by the image-information acquiring unit 801 (step S904). For example, when the image information acquired is image information of an exchangeable image file format (Exif), data such as a manufacturer, a serial number, and imaging sensitivity of an imaging apparatus, and an exposure time at the time of imaging are recorded in the image information.

Concerning steps S905 to S910, the explanations made with reference to FIGS. 4A and 4B are referred to. The image-information converting unit 812 converts the image information of the YUV format generated by the image-information combining unit 107 into image information of, for example, the RGB format (step S911). In converting the image information of the YUV format into image information of the RGB format, the image-information converting unit 812 converts the image information according to the following conversion equation (3).

$$\begin{bmatrix} R \\ G \\ B \end{bmatrix} = \begin{bmatrix} 1.0 & 1.402 & 0 \\ 1.0 & -0.714 & -0.344 \\ 1.0 & 0 & 1.772 \end{bmatrix} \begin{bmatrix} Y \\ U \\ V \end{bmatrix} \quad (3)$$

The image-information output unit 809 outputs the image information converted by the image-information converting unit 812 to a storage medium and a printer (step S912).

In this way, in the image processing apparatus, since image information of the YUV format is separated into luminance information and color information and noise is removed from the luminance information and the color information, it is possible to remove noise while preventing deterioration in an image quality. Since noise is removed from the luminance information and the color information using a filter suitable for each of the luminance information and the color information, it is possible to perform effective noise removal taking into account the characteristic of human eyes.

Figure 10:
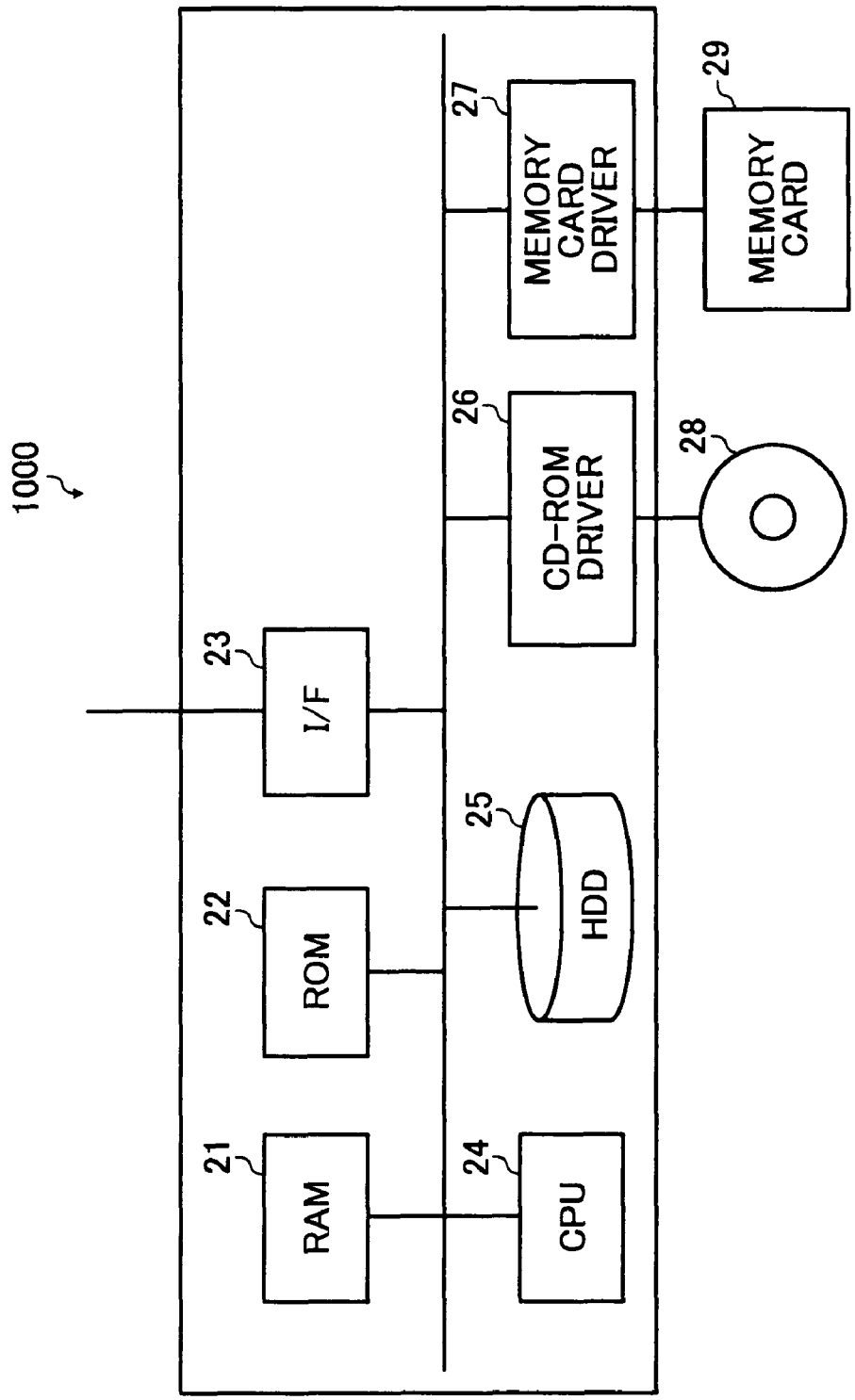
FIG. 10 is a block diagram of a hardware configuration of the image processing apparatus shown in FIG. 8.

FIG. 10 is a block diagram of a hardware configuration of the image processing apparatus according to this embodiment. An image processing apparatus 1000 includes a central processing unit (CPU) 24 that centrally controls respective units of the image processing apparatus 1000. A read only memory (ROM) 22 having stored therein a basic input/output system (BIOS) and the like and a random access memory (RAM) 21 that rewritably stores therein various data and functions as a work area for the CPU are connected to the CPU 24 via a bus to constitute a microcomputer. Moreover, a hard disk (HD) 25 having stored therein a control program, a compact disc (CD)-ROM drive 26 that reads a CD-ROM, and an interface (I/F) 23 that manages communication with a printer and the like are connected to the bus.

A predetermined control program is stored in a CD-ROM 28 shown in FIG. 10. The CPU 24 reads the control program stored in the CD-ROM 28 using a CD-ROM driver 26 and installs the control program in the HD 25. Consequently, the image processing apparatus is capable of performing the various kinds of processing described above. Image information and the like are stored in a memory card 29 and read by a memory card driver 27.

As the storage medium, it is possible to use not only a CD-ROM and a memory card but also media of various systems including various optical disks such as a DVD, various magneto-optical disks, various magnetic disks such as a floppy disk, and a semiconductor memory. A program may be downloaded from a network such as the Internet and installed in the HD 25. In this case, a storing device that stores therein the program in a server on a transmission side is also the storage medium of the present invention. The program may be a program that runs on a predetermined operating system (OS). In that case, the program may cause the OS to take over a part of various kinds of processing described later. The program may be included as a part of a group of program files forming predetermined application software such as word processor software, the OS, and the like.

As in the first embodiment, it is possible to constitute the filter size database 120 and the Gaussian σ value database 130 using any storage medium generally used such as an HD, an optical disk, or a memory card.

The image processing program executed in the image processing apparatus according to this embodiment may be stored on a computer connected to a network such as the Internet, downloaded through the network, and provided. Alternatively, the image processing program executed in the image processing apparatus according to this embodiment may be provided or distributed through the network such as the Internet.

The image processing program according to this embodiment may be stored in a ROM or the like in advance and provided.

The image processing program executed in the image processing apparatus according to this embodiment is recorded in a computer-readable recording medium such as a compact disc-read only memory (CD-ROM), a flexible disk (FD), a compact disc-recordable (CD-R), or a digital versatile disk (DVD) as a file of an installable format or an executable format and provided.

The image processing program executed in the image processing apparatus according to this embodiment is formed as a module including the respective units described above (the image-information acquiring unit, the image-information converting unit, the component separating unit, the imaging-condition acquiring unit, the filter determining unit, the luminance-component-noise removing unit, the color-component-noise removing unit, the image-information combining unit, the image-information output unit, etc.). A CPU (a processor) reads out the image processing program from the storage medium and executes the image processing program. Consequently, the respective units are loaded onto a main storage and an image-information acquiring unit, an image-information converting unit, a component separating unit, an imaging-condition acquiring unit, a filter determining unit, a luminance-component-noise removing unit, a color-component-noise removing unit, an image-information combining unit, an image-information outputting unit, and the like are generated on the main storage as actual hardware.

The present invention can be applied to image processing units other than a digital camera such as a multifunction peripheral (MPF), a personal computer, or a mobile telephone. Moreover, the image acquiring function can be separated from the image processing unit, i.e., image data can be input into the image processing unit from a camera or the like. Alternatively, image data can be downloaded into the image processing unit from another device, such as a server, through a network, such as the Internet.

According to an embodiment of the present invention, the image-information acquiring unit acquires image information. The image-component separating unit separates the image information into luminance information and color information. The luminance-noise removing unit removes noise from the luminance information using the first noise removing method. The color-noise removing unit removes noise from the color information using the second noise removing method different from the first noise removing method. This makes it possible to apply a noise removing method, which is suitable for each of the luminance information and the color information, to the information. Thus, there is an effect that it is possible to obtain high-quality images.

Moreover, the luminance-noise removing unit removes noise using, as the first noise removing method, a noise removing method having a degree of smoothness lower than that of the second noise removing method. This makes it possible to apply a noise removing method suitable for the characteristic of human eyes to the luminance information and the color information. Thus, there is an effect that it is possible to obtain high-quality images suitable for human senses.

Furthermore, the luminance-noise removing unit uses, as the first noise removing method, the luminance filter that removes noise of the luminance information. The color-noise removing unit uses, as the second noise removing method, the color filter that removes noise of the color information. The color filter removes noise using a filter larger in size than the luminance filter. This makes it possible to apply a noise removing method suitable for the characteristic of human eyes to the luminance information and the color information. Thus, there is an effect that it is possible to obtain high-quality images suitable for human senses.

Moreover, the filter-size storing unit stores therein imaging conditions indicating an imaging state at the time of imaging of the image information, sizes of the luminance filter, and sizes of the color filter in association with one another. The imaging-condition acquiring unit acquires the imaging conditions. The luminance-noise removing unit specifies a size of the luminance filter associated with the imaging conditions in the filter-size storing unit and removes noise using the luminance filter of the size specified. The color-noise removing unit specifies a size of the color filter associated with the imaging conditions in the filter-size storing unit and removes noise using the color filter of the size specified. This makes it possible to remove noise using a filter of a different size corresponding to the imaging conditions for each of the luminance information and the color information. Thus, there is an effect that it is possible to obtain high-quality images.

Furthermore, the parameter storing unit stores therein imaging conditions indicating an imaging state at the time of imaging of the image information and σ values, which are parameters in a Gaussian function, in association with each other. The filter determining unit specifies a σ value associated with the imaging conditions in the parameter storing unit. The luminance-noise removing unit determines the luminance filter based on a size of the luminance filter associated with the imaging conditions in the filter-size storing unit and the Gaussian function defined by the σ value and removes noise using the luminance filter determined. The color-noise removing unit determines the color filter based on a size of the color filter associated with the imaging conditions in the filter-size storing unit and the Gaussian function defined by the σ value and removes noise using the color filter determined. This makes it possible to remove noise using a different filter corresponding to the imaging conditions for each of the luminance information and the color information. Thus, there is an effect that it is possible to obtain high-quality images.

Moreover, the filter storing unit stores therein imaging conditions indicating an imaging state at the time of imaging of the image information, a luminance filter having a size and a value of a filter that removes noise of the luminance information, and a color filter having a size and a value of a filter that that removes noise of the color information in association with one another. The imaging-condition acquiring unit acquires the imaging conditions. The filter determining unit determines the luminance filter and the color filter associated with the imaging conditions in the filter storing unit. The luminance-noise removing unit removes noise from the luminance information using the luminance filter. The color-noise removing unit removes noise from the color information using the color filter. This makes it possible to remove noise using a different filter corresponding to the imaging conditions for each of the luminance information and the color information. Thus, there is an effect that it is possible to obtain high-quality images.

Furthermore, the imaging conditions include an exposure time. This makes it possible to perform noise removal suitable for a level of noise. Thus, there is an effect that it is possible to obtain high-quality images.

Moreover, the imaging conditions include temperature at the time of imaging. This makes it possible to perform noise removal suitable for a level of noise. Thus, there is an effect that it is possible to obtain high-quality images.

Furthermore, the imaging conditions include imaging sensitivity. This makes it possible to perform noise removal suitable for a level of noise. Thus, there is an effect that it is possible to obtain high-quality images.

Moreover, the image pickup unit picks up an image and generates image information. The image-component separating unit separates the image information into luminance information and color information. The luminance-noise removing unit removes noise from the luminance information using a first noise removing method. The color-noise removing unit removes noise from the color information using a second noise removing method different from the first noise removing method used in the luminance-noise removing unit. This makes it possible to use a noise removing method suitable for each of the luminance information and the color information. Thus, there is an effect that it is possible to obtain high-quality images.

Furthermore, image information is acquired in the image-information acquiring step. The image information is separated into luminance information and color information in the image-component separating step. Noise is removed from the luminance information using a first noise removing method in the luminance-noise removing step. Noise is removed from the color information using a second noise removing method different from the first noise removing method used in the luminance-noise removing step. This makes it possible to use a noise removing method suitable for each of the luminance information and the color information. Thus, there is an effect that it is possible to obtain high-quality images.

Moreover, the image processing program causes a computer to execute the image processing method. This makes it possible to use a noise removing method suitable for each of the luminance information and the color information. Thus, there is an effect that it is possible to obtain high-quality images.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an image-information acquiring unit to acquire image information;
    an image-component separating unit to separate the image information acquired by the image-information acquiring unit into luminance information and color information;
    a luminance-noise removing unit to remove noise from the luminance information by using a first noise removing method, wherein the luminance-noise removing unit uses, as the first noise removing method, a luminance filter that removes noise associated with the luminance information;
    a color-noise removing unit to remove noise from the color information by using a second noise removing method different from the first noise removing method, wherein the color-noise removing unit uses, as the second noise removing method, a color filter that removes noise associated with the color information;
    a filter-size storing unit to store therein a table showing association among imaging conditions indicating an imaging state at the time of imaging of the image information, filter sizes of the luminance filter, and filter sizes of the color filter, wherein the filter size of the color filter is set to be larger than the size of the luminance filter; and
    an imaging-condition acquiring unit to acquire the imaging conditions, wherein
    the luminance-noise removing unit specifies, by referring to the table stored in the filter-size storing unit, a filter size of the luminance filter associated with the imaging conditions, which are acquired by the imaging-condition acquiring unit, and removes noise using the luminance filter of specified filter size, and
    the color-noise removing unit specifies, by referring to the table stored in the filter-size storing unit, a filter size of the color filter associated with the imaging conditions, which are acquired by the imaging-condition acquiring unit, and removes noise using the color filter of specified filter size.

2. The image processing apparatus according to claim 1, further comprising:
    a parameter storing unit to store therein imaging conditions indicating an imaging state at the time of imaging of the image information and a values, which are parameters in a Gaussian function, in associated manner; and
    a filter determining unit to specify a σ value associated with the imaging conditions, which are acquired by the imaging-condition acquiring unit, in the parameter storing unit, wherein
    the luminance-noise removing unit determines the luminance filter based on a coarseness of the luminance filter associated with the imaging conditions, which are acquired by the imaging-condition acquiring unit, in the filter-size storing unit and a Gaussian function defined by the σ value specified by the filter determining unit and removes noise using determined luminance filter, and
    the color-noise removing unit determines the color filter based on a coarseness of the color filter associated with the imaging conditions, which are acquired by the imaging-condition acquiring unit, in the filter-size storing unit and a Gaussian function defined by the σ value specified by the filter determining unit and removes noise using determined color filter.

3. The image processing apparatus according to claim 1, further comprising:
    a filter storing unit to store therein imaging conditions indicating an imaging state at the time of imaging of the image information, a luminance filter having a coarseness and a value of a filter that removes noise of the luminance information, and a color filter having a coarseness and a value of a filter that removes noise of the color information in association with one another;
    an imaging-condition acquiring unit to acquire the imaging conditions; and
    a filter determining unit to determine the luminance filter and the color filter associated with the imaging conditions, which are acquired by the imaging-condition acquiring unit, in the filter storing unit, wherein
    the luminance-noise removing unit removes noise from the luminance information using the luminance filter determined by the filter determining unit, and
    the color-noise removing unit removes noise from the color information using the color filter determined by the filter determining unit.

4. The image processing apparatus according to claim 3, wherein the imaging conditions include an exposure time.

5. The image processing apparatus according to claim 3, wherein the imaging conditions include temperature at the time of imaging.

6. The image processing apparatus according to claim 3, wherein the imaging conditions include imaging sensitivity.

7. An image processing method comprising:
    acquiring image information;
    separating the image information acquired at the acquiring into luminance information and color information;
    removing noise from the luminance information by using a first noise removing method, wherein removing noise using the first noise removing method includes using, as the first noise removing method, a luminance filter that removes noise of the luminance information;

removing noise from the color information by using a second noise removing method different from the first noise removing method, wherein removing noise using the second noise removing method includes using, as the second noise removing method, a color filter that removes noise of the color information; and storing a table showing association among imaging conditions indicating an imaging state at the time of imaging of the image information, filter sizes of the luminance filter, and filter sizes of the color filter, wherein the filter size of the color filter is set to be larger than the size of the luminance filter in a filter-size storing unit; and acquiring the imaging conditions, wherein removing noise using the first noise removing method includes specifying, by referring to the table stored in the filter-size storing unit, a filter size of the luminance filter associated with the imaging conditions acquired at the acquiring, and removing noise using the luminance filter of specified filter size, and removing noise using the second noise removing method includes specifying, by referring to the table stored in the filter-size storing unit, a filter size of the color filter associated with the imaging conditions acquired at the acquiring, and removing noise using the color filter of specified filter size.

8. The image processing method according to claim 7, further comprising:

storing imaging conditions indicating an imaging state at the time of imaging of the image information and σ values, which are parameters in a Gaussian function, in associated manner in a parameter storing unit; and specifying a σ value associated with the imaging conditions acquired at the acquiring in the parameter storing unit, wherein removing noise using the first noise removing method includes determining the luminance filter based on a coarseness of the luminance filter associated with the imaging conditions acquired at the acquiring in the filter-size storing unit and a Gaussian function defined by the σ value specified at the specifying, and removing noise using determined luminance filter, and removing noise using the second noise removing method includes determining the color filter based on a coarseness of the color filter associated with the imaging conditions acquired at the acquiring in the filter-size storing unit and a Gaussian function defined by the σ value specified at the specifying, and removing noise using determined color filter.

9. The image processing method according to claim 7, further comprising:

storing imaging conditions indicating an imaging state at the time of imaging of the image information, a luminance filter having a coarseness and a value of a filter that removes noise of the luminance information, and a color filter having a coarseness and a value of a filter that removes noise of the color information in association with one another in a filter storing unit;

acquiring the imaging conditions; and determining the luminance filter and the color filter associated with the imaging conditions acquired at the acquiring unit in the filter storing unit, wherein removing noise using the first noise removing method includes removing noise from the luminance information using the luminance filter determined at the determining, and removing noise using the second noise removing method includes removing noise from the color information using the color filter determined at the determining.

10. The image processing method according to claim 9, wherein the imaging conditions include an exposure time.

11. The image processing method according to claim 9, wherein the imaging conditions include temperature at the time of imaging.

12. The image processing method according to claim 9, wherein the imaging conditions include imaging sensitivity.

13. A non-transitory computer readable storage medium having computer readable program codes embodied in the medium that when executed causes a computer to execute a method comprising:

acquiring image information;

separating the image information acquired at the acquiring into luminance information and color information;

removing noise from the luminance information by using a first noise removing method, wherein removing noise using the first noise removing method includes using, as the first noise removing method, a luminance filter that removes noise of the luminance information;

removing noise from the color information by using a second noise removing method different from the first noise removing method, wherein removing noise using the second noise removing method includes using, as the second noise removing method, a color filter that removes noise of the color information; and storing a table showing association among imaging conditions indicating an imaging state at the time of imaging of the image information, filter sizes of the luminance filter, and filter sizes of the color filter, wherein the filter size of the color filter is set to be larger than the size of the luminance filter in a filter-size storing unit; and acquiring the imaging conditions, wherein removing noise using the first noise removing method includes specifying, by referring to the table stored in the filter-size storing unit, a filter size of the luminance filter associated with the imaging conditions acquired at the acquiring, and removing noise using the luminance filter of specified filter size, and removing noise using the second noise removing method includes specifying, by referring to the table stored in the filter-size storing unit, a filter size of the color filter associated with the imaging conditions acquired at the acquiring, and removing noise using the color filter of specified filter size.

* * * * *